United States Patent [19]

Seki et al.

(10) Patent No.: US 7,593,979 B2
(45) Date of Patent: Sep. 22, 2009

(54) ELECTRONIC APPARATUS, NETWORK SYSTEM, RELAY APPARATUS, AND STATUS CONTROL METHOD

(75) Inventors: Michio Seki, Tokyo (JP); Yasuhiro Ishibashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 731 days.

(21) Appl. No.: 10/602,678

(22) Filed: Jun. 25, 2003

(65) Prior Publication Data

US 2004/0060066 A1 Mar. 25, 2004

(30) Foreign Application Priority Data

Jun. 27, 2002 (JP) ............................. 2002-188444

(51) Int. Cl.
*G06F 15/16* (2006.01)
(52) U.S. Cl. ..................... 709/200; 700/12; 710/14; 710/19; 713/310; 713/320; 713/340; 340/693.3
(58) Field of Classification Search ................ 340/3.7, 340/825.72; 700/17, 83, 12; 709/223, 208, 709/246, 203, 219, 220, 250; 710/305, 104, 710/105, 9, 10, 72; 713/320, 323, 310, 340; 715/501.1; 345/734; 348/730; 359/125; 725/37, 25, 56; 381/306; 370/402; 330/149; 455/11

See application file for complete search history.

(56) References Cited

U.S. PATENT DOCUMENTS

| 4,825,209 | A | * | 4/1989 | Sasaki et al. ............ 340/825.72 |
| 5,532,753 | A | * | 7/1996 | Buchner et al. ................ 725/56 |
| 5,621,659 | A | * | 4/1997 | Matsumoto et al. ............. 710/10 |
| 5,754,548 | A | * | 5/1998 | Hoekstra et al. ............. 370/402 |
| 5,905,442 | A | | 5/1999 | Mosebrook et al. |
| 5,959,536 | A | * | 9/1999 | Chambers et al. ............ 710/104 |
| 6,326,844 | B1 | * | 12/2001 | Morris et al. ................. 330/149 |
| 6,349,352 | B1 | * | 2/2002 | Lea ............................... 710/72 |
| 6,381,507 | B1 | * | 4/2002 | Shima et al. ................... 700/83 |
| 6,526,516 | B1 | * | 2/2003 | Ishikawa et al. ............. 713/340 |
| 6,574,452 | B1 | * | 6/2003 | Morvan et al. .............. 455/11.1 |
| 6,640,239 | B1 | * | 10/2003 | Gidwani ...................... 709/203 |

(Continued)

FOREIGN PATENT DOCUMENTS

FR 2 808 393 11/2001

(Continued)

OTHER PUBLICATIONS

Notification of Reasons for Rejection issued by Japanese Patent Office on Mar. 8, 2005, in Japanese Application No. 2002-188444.

*Primary Examiner*—Dustin Nguyen
(74) *Attorney, Agent, or Firm*—Finnegan, Henderson, Farabow, Garrett & Dunner, L.L.P.

(57) ABSTRACT

An AV function section is provided with a standby mode serving to reduce power consumption during standby. An embedded controller provides such control as shifts or recovers the AV function section to or from the standby mode. Further, a network processor accepts, via a network such as a wireless LAN, a command causing the AV function section to shift to or recover from the standby mode. On the basis of this command, the network processor instructs, via a control signal line, the embedded controller to shift or recover the AV function section to or from the standby mode.

3 Claims, 5 Drawing Sheets

U.S. PATENT DOCUMENTS

| | | | |
|---|---|---|---|
| 6,721,818 B1* | 4/2004 | Nakamura | 710/9 |
| 6,759,967 B1* | 7/2004 | Staller | 340/825.72 |
| 6,772,354 B2* | 8/2004 | Takenaka et al. | 713/310 |
| 6,785,720 B1* | 8/2004 | Seong | 709/220 |
| 6,789,208 B2* | 9/2004 | Noda et al. | 713/323 |
| 6,844,807 B2* | 1/2005 | Inoue et al. | 340/3.7 |
| 6,928,563 B2* | 8/2005 | Kato | 713/320 |
| 6,944,704 B2* | 9/2005 | Brelin | 710/305 |
| 7,039,858 B2* | 5/2006 | Humpleman et al. | 715/501.1 |
| 7,058,458 B2* | 6/2006 | Munezane | 700/12 |
| 7,191,267 B2* | 3/2007 | Noda et al. | 710/105 |
| 7,200,683 B1* | 4/2007 | Wang et al. | 709/250 |
| 2001/0029587 A1* | 10/2001 | Takenaka et al. | 713/300 |
| 2002/0021372 A1* | 2/2002 | Konda et al. | 348/730 |
| 2002/0021465 A1* | 2/2002 | Moore et al. | 359/125 |
| 2002/0026532 A1* | 2/2002 | Maeda et al. | 709/250 |
| 2002/0046311 A1* | 4/2002 | Kageyama | 710/105 |
| 2002/0062392 A1* | 5/2002 | Nishikawa et al. | 709/246 |
| 2002/0069276 A1* | 6/2002 | Hino et al. | 709/223 |
| 2002/0111698 A1* | 8/2002 | Graziano et al. | 700/17 |
| 2002/0163534 A1* | 11/2002 | Choi et al. | 345/734 |
| 2002/0169845 A1* | 11/2002 | Szucs et al. | 709/208 |
| 2002/0184620 A1* | 12/2002 | Davies et al. | 725/25 |
| 2002/0194596 A1* | 12/2002 | Srivastava | 725/37 |
| 2003/0018753 A1* | 1/2003 | Seki | 709/219 |
| 2004/0234088 A1* | 11/2004 | McCarty et al. | 381/306 |

FOREIGN PATENT DOCUMENTS

| | | |
|---|---|---|
| JP | 2001-16221 | 1/2001 |
| JP | 2001-309455 | 11/2001 |

* cited by examiner

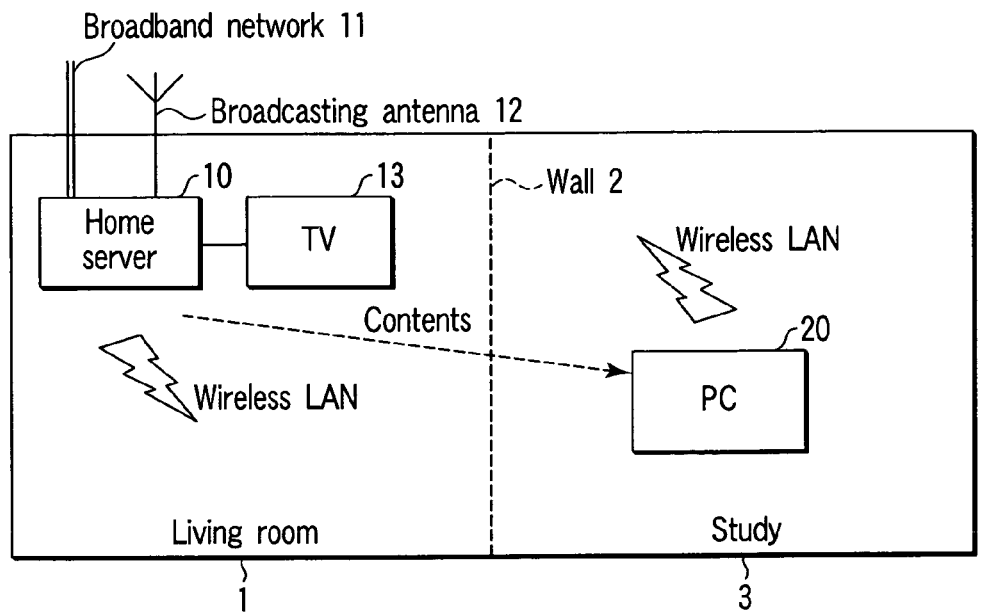
F I G. 1
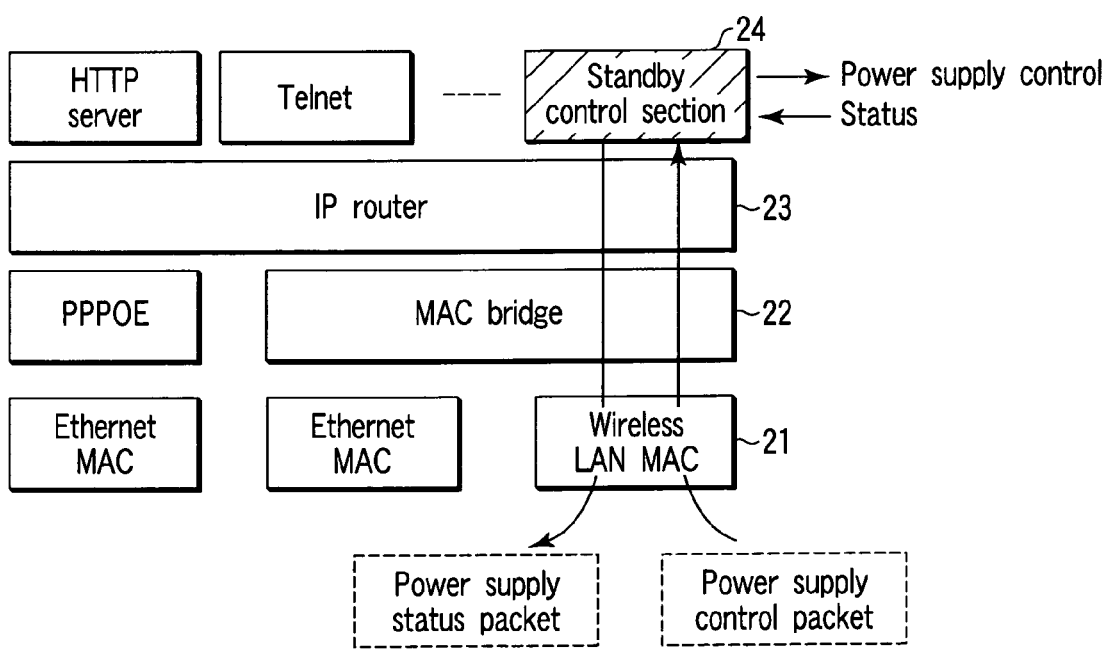
F I G. 3

ELECTRONIC APPARATUS, NETWORK SYSTEM, RELAY APPARATUS, AND STATUS CONTROL METHOD

CROSS-REFERENCE TO RELATED APPLICATIONS

This application is based upon and claims the benefit of priority from the prior Japanese Patent Application No. 2002-188444, filed Jun. 27, 2002, the entire contents of which are incorporated herein by reference.

BACKGROUND OF THE INVENTION

1. Field of the Invention

The present invention relates to a relay apparatus that receives and records, for example, television broadcasting and distributes this image data to electronic apparatus via a network, the electronic apparatus that receives the image data distributed by the relay apparatus, a network system composed of the relay apparatus and electronic apparatus, and a status control method, and in particular, to a relay apparatus, electronic apparatus, a network system, and a status control method wherein it is possible to, for example, allow the electronic apparatus to instruct, via the network, an AV function section of the relay apparatus to shift to or recover from its standby status.

2. Description of the Related Art

In recent years, moving-picture compression techniques and information communication techniques have been markedly improved. Further, the union of AV apparatus and network apparatus has been sped up. Specifically, a single apparatus called a "home gateway" or the like is used to implement, for example, an AV function for recording and reproduction and a network function for playing the roles of a router and an access point.

The home gateway allows video data to be distributed using a domestic network instead of conventional analog video cable. Accordingly, for example, a user in a study located away from a living room where the home gateway is installed can view video data from the home gateway using a notebook personal computer carried in the study.

Further, electronic apparatus such as this home gateway is provided with a standby mode in which power supply to the sections other than those which must be always operated, e.g., an AV function section is interrupted, in order to reduce power consumption during standby.

Shift to or recovery from the standby mode may be automatically executed by the home gateway under predetermined conditions or by the user on the basis of an explicit instruction given by, for example, operating a remote controller.

Here, it is assumed that after finishing viewing video data from the home gateway installed in the living room, using the notebook personal computer carried in the study, the user shifts the home gateway to the standby mode.

The remote controller irradiates a light receiving section of the home gateway with a very directional infrared ray to transmit a command signal. Thus, it cannot be utilized to transmit command signals between two places partitioned by a wall or the like. That is, after all, the user must go to the living room in order to shift or recover the home gateway to or from the standby mode.

Further, the user does not know the current status of the home gateway installed in the living room if, for example, he or she has been in the study from the outset.

BRIEF SUMMARY OF THE INVENTION

An embodiment of the present invention may provide a electronic apparatus which can communicate with a different electronic apparatus, the electronic apparatus comprising: an inquiring unit configured to inquire the different electronic apparatus about an operational status of the different electronic apparatus; a receiving unit configured to receive the operational status of the different electronic apparatus from the different electronic apparatus; and a display unit which can display the operational status of the different electronic apparatus received via the receiving unit.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing an example of a domestic network system according to an embodiment of the present invention;

FIG. 3 is a diagram showing a stack configuration of a network processor in the home server according to this embodiment;

DETAILED DESCRIPTION OF THE INVENTION

Figure 2:
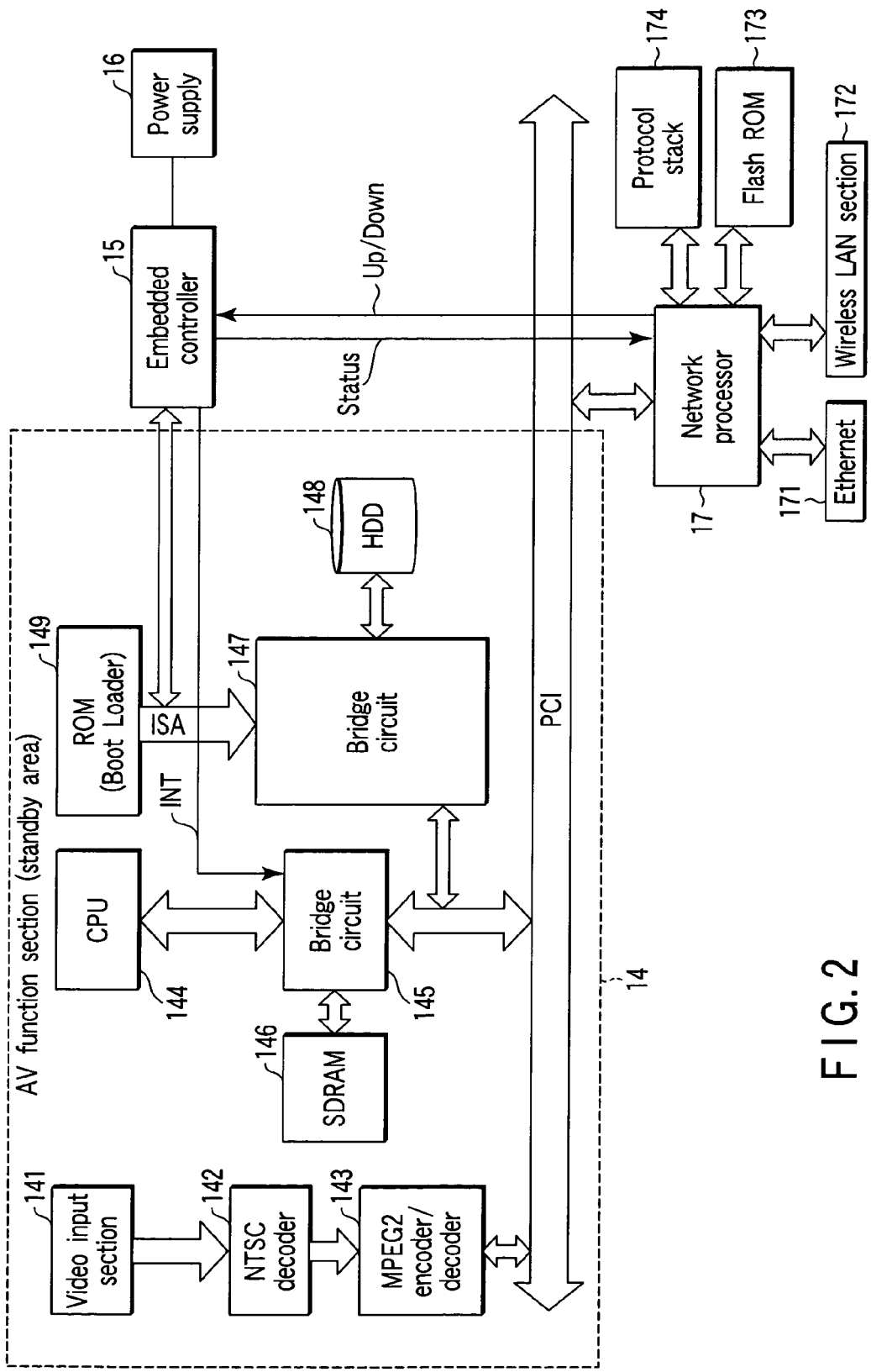
FIG. 2 is a diagram showing a configuration of a home server according to this embodiment.

The embodiments of the present invention will be described below with reference to the drawings.

FIG. 1 is a diagram showing an example of a domestic network system according to this embodiment of the present invention.

This domestic network is a wireless LAN in which a home server 10 placed in a living room 1 transmits and receives data to and from a personal computer 20 in a study 3 separated from the living room 1 by a wall 2, on the basis of a wireless communication protocol such as IEEE 802.11b, as shown in FIG. 1.

The home server 10 is a so-called home gateway. It is provided with a function of, for example, loading video data dispatched to a broadband network 11 to store the data, receiving video data dispatched over electromagnetic waves, through a broadcasting antenna 12 to store the data, outputting the stored video data to a television apparatus 13, or distributing the data to the personal computer 20 via a wireless LAN.

Thus, a user can use the television apparatus 13 to view video data while in the living room. On the other hand, while in the study, the user can use the personal computer 20 to view video data.

FIG. 2 is a diagram showing a configuration of the home server 10.

An AV function section 14 is a mechanism that processes reception, storage, and distribution of video data, i.e., main service provided to the user by the home server 10. The AV function section 14 is provided with a standby mode serving to reduce power consumption during standby. Further, to provide this service, the AV function section 14 has a video input section 141 to which video data is input, an NTSC decoder 142 that decodes the input video data into NTSC format, an MPEG2 encoder/decoder 143 that compresses the decoded video data into MPEG2 format or expands the compressed video data, a CPU 144 that controls the entire AV function section 14, a bridge circuit 145 that bridges between a processor bus and a PCI bus, an SDRAM 146 connected to the bridge circuit 145 and acting as a main memory to store programs and data used by the CPP 144, a bridge circuit 147 that bridges between the PCI bus and an ISA bus, an HDD 148 connected to the bridge circuit 147 and acting as an external storage to store a large amount of programs and data loaded into the SDRAM 146 or swapped by the SDRAM 146, and a ROM 149 that stores a boot loader.

Further, an embedded controller 15 instructs the AV function section 14 to shift to and recover from the standby mode. Concurrently with the shift to and recovery from the standby mode, the embedded controller 15 provides such control as supplies power from a power supply 16 to the AV function section 14 or interrupts this power supply.

A network processor 17 plays the role of a receptionist to allow the personal computer 20 to cause, via a network, the AV function section 14 to shift to and recover from the standby mode; this operation is characteristic of the present invention. The network processor 17 has an Ethernet section 171, a wireless LAN section 172, a flash ROM 173, and an SDRAM 174.

The Ethernet section 171 is a circuit that controls data transfers in lower layers of an OSI. Further, concurrently with such an operation of the Ethernet section 171, the wireless LAN section 172 controls data transfers in the lower layers of the OSI in conformity with a wireless communication protocol such as IEEE 802.11. Further, the flash ROM 173 stores a program describing a procedure of operating the network processor 17, various parameters, and the like. The SDRAM 174 stores a protocol stack that executes a predetermined data transfer procedure using the Ethernet section 171 or the wireless LAN section 172.

The following two signal lines are arranged between the network processor 17 and embedded controller 15 configured as described above: an up/down signal line used to allow the network processor 17 to instruct the embedded controller 15 to shift to or recover from the standby mode and a status signal line used to allow the embedded controller 15 to indicate the status of the AV function section 14 to the network processor 17. An up/down signal transmitted via the up/down signal line is a toggle signal. The AV function section 14 is controlled to toggle its status at each rising edge of the up/down signal.

Upon receiving a command allowing the personal computer 20 to cause, via the network, the AV function section 14 to shift to the standby mode, the network processor 17 references a status signal outputted by the embedded controller 15 to check the current status of the AV function section 14. If the mode is not standby, the network processor 17 changes the up/down signal to a high level and then to a low level to generate a rising edge to instruct the AV function section 14 to shift to the standby mode. Similarly, upon receiving a command causing the AV function section 14 to recover from the standby mode, the network processor 17 checks the current status of the AV function section 14. If the mode is standby, the network processor 17 uses the up/down signal to instruct the AV function section 14 to recover from the standby mode.

On the other hand, upon receiving a rising edge of the up/down signal, the embedded controller 15 dispatches a so-called INT signal to instruct the CPU 144 to get ready to shift to the standby mode. Upon receiving an acknowledge signal indicating that the CPU 144 is now ready, the embedded controller 15 controls the power supply 16 to interrupt power supply to the AV function section 14. On the other hand, to recover from the standby mode, the embedded controller 15 controls the power supply 16 to resume power supply to the AV function section 14.

FIG. 3 is a diagram showing a stack configuration of the network processor 17.

A command transmitted by the personal computer 20 via the network to shift, for example, the AV function section 14 to the standby mode is passed to a standby control section 24 via a wireless LAN MAC 21, a MAC bridge 22, and an IP router 23 as a power supply control packet. Upon receiving this power supply control packet, the standby control section 24 uses the status signal dispatched by the embedded controller 15 to check the status of the AV function section 14. The standby control section 24 then gives an instruction to the embedded controller 15 to shift the AV function section 14 to the standby mode. Then, the standby control section 24 transmits a notification to the personal computer 20 as a power supply status packet, the notification indicating that the AV function section 14 has shifted to the standby mode. This power supply status packet is passed to the personal computer 20 via the IP router 23, the MAC bridge 22, and the wireless LAN MAC 21.

Figure 4:
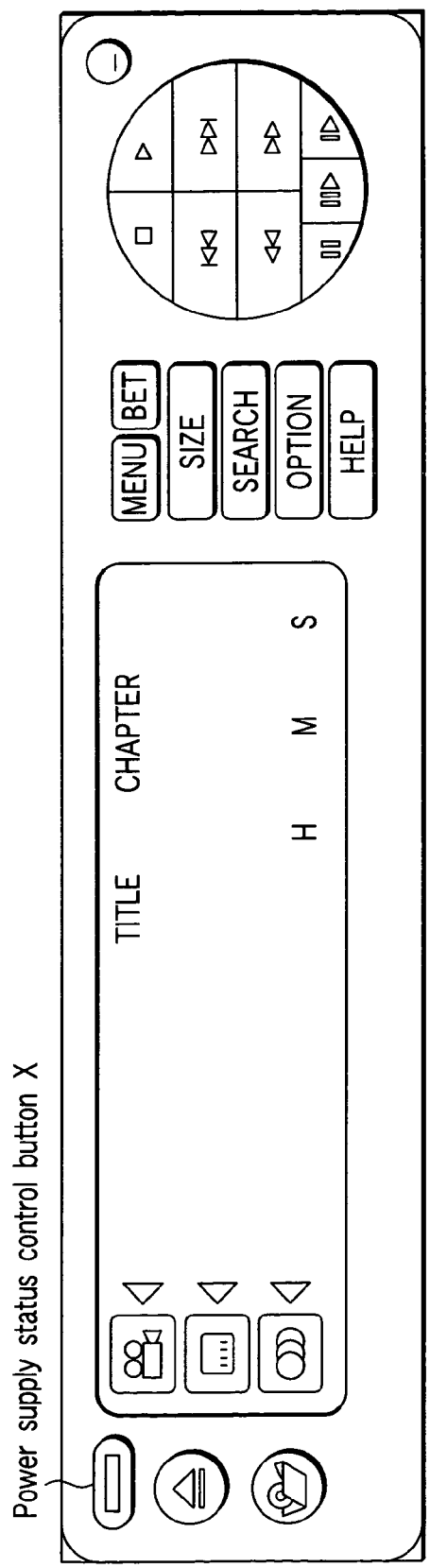
FIG. 4 is a view illustrating a control panel displayed on a screen of a personal computer in order to operate an AV function section of the home server according to this embodiment.

FIG. 4 shows a control panel displayed on a screen of the personal computer 20 in order to operate the AV function section 14 of the home server 10. When a pointing device such as a mouse is used to depress a power supply status control button X on the control panel, a command is transmitted to the home server 10, the command causing the AV function section 14 to shift to or recover from the standby mode. Further, the power supply status control button X changes its color on the basis of the contents of the power supply status packet from the home server. That is, it is red when the AV function section 14 is in the standby mode. It is otherwise green, i.e., when the AV function section 14 is performing normal operations. Thus, the user of the personal computer 20 is notified of the current status of AV function section 14 of the home server 10.

Figure 5A:
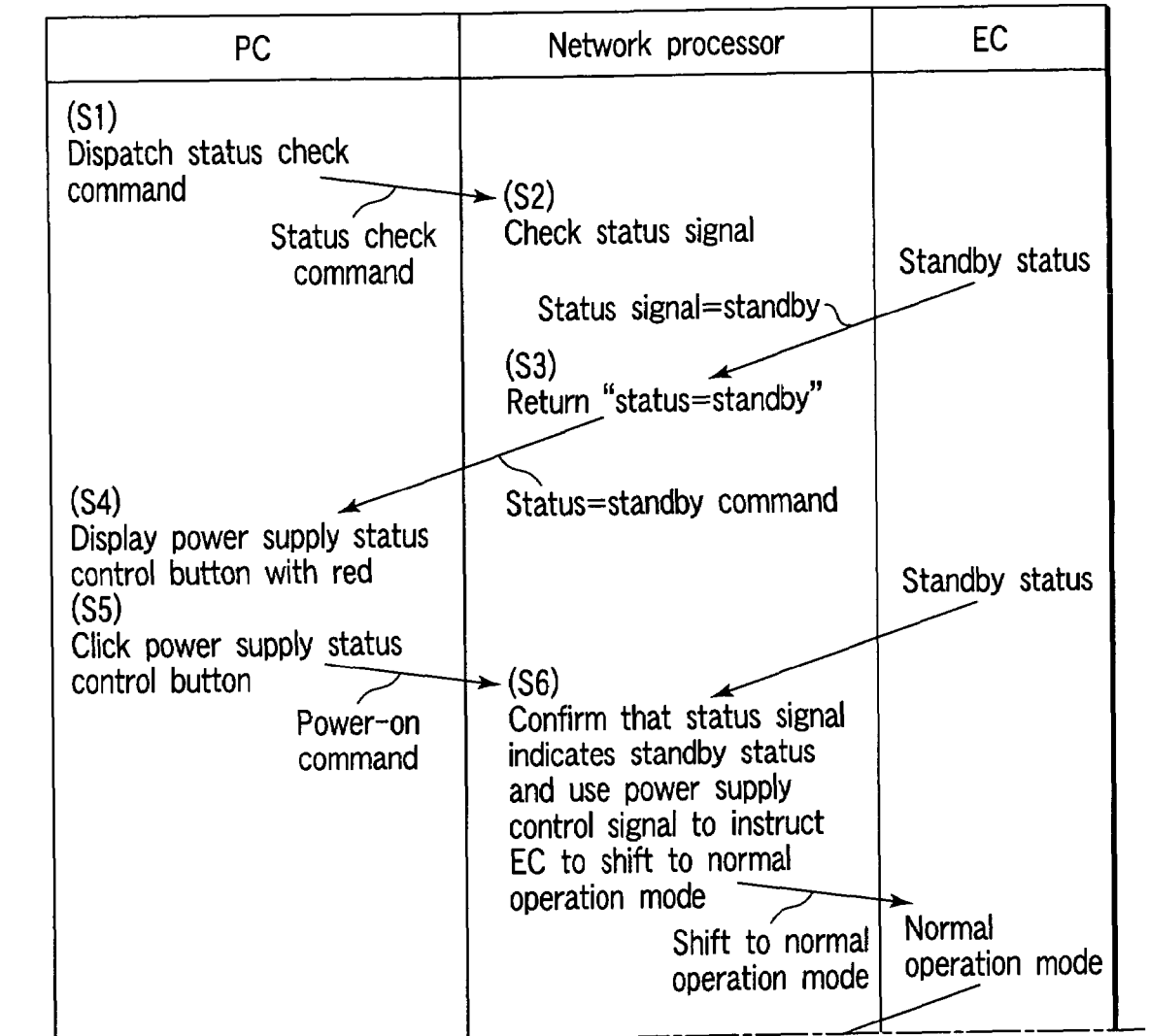
FIGS. 5A and 5B are timing charts showing the flow of operations of the domestic network system according to this embodiment.
Figure 5B:
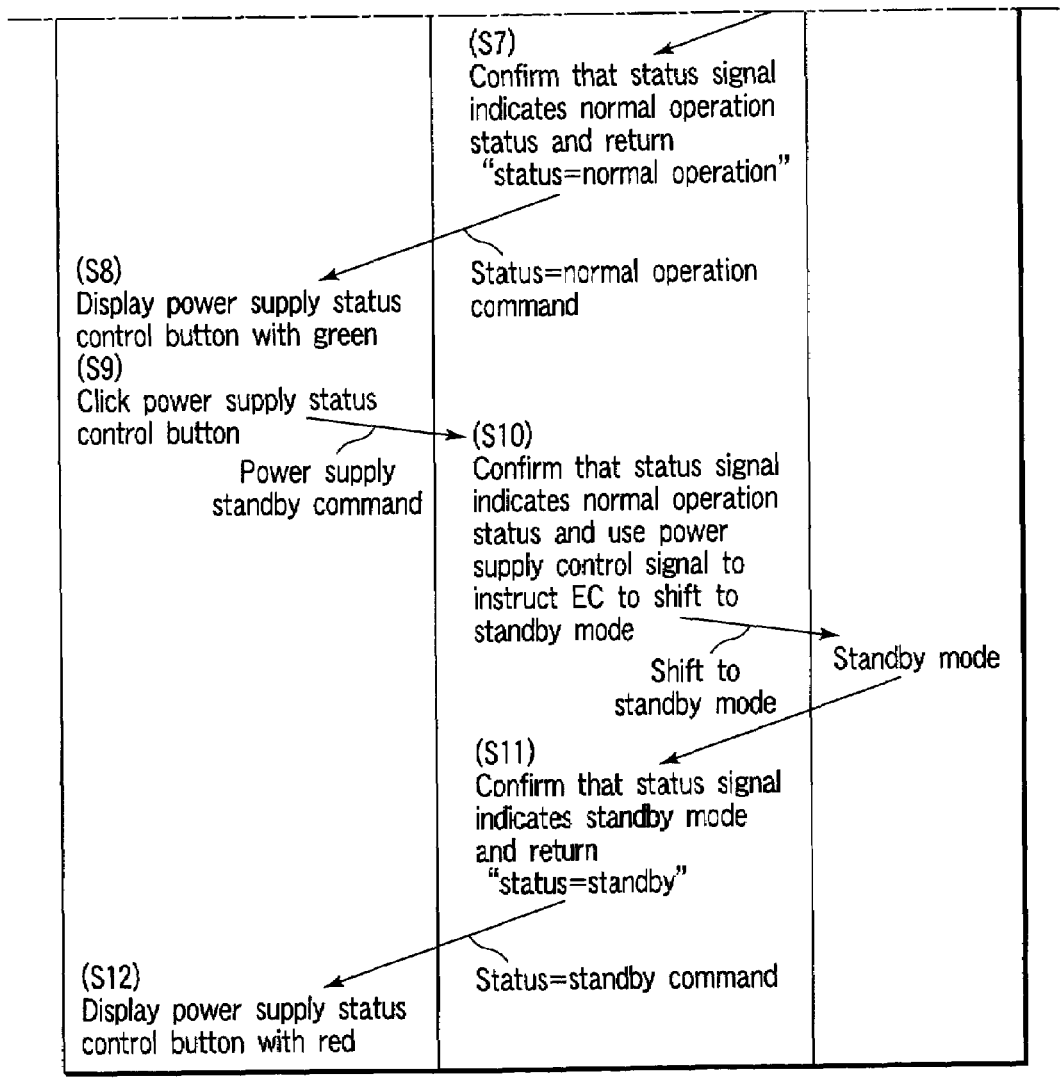

Now, with reference to FIGS. 5A and 5B, description will be given of flow of operations of this domestic network system.

During the start-up of operation software for the home server 10 including the display of screen of the control panel, the personal computer 20 first transmits a status check command to the home server 10 in order to check the current status of the AV function section 14 (S1). Upon receiving this status check command, the network processor 17 checks a status signal output by the embedded controller 15 (S2). In this case, the AV function section 14 is assumed to be in the standby mode.

After confirming that the AV function section 14 is in the standby mode, on the basis of this status signal, the network processor 17 returns a status command indicating the standby status (S3). The personal computer 20 determines from the returned status command that the AV function section 14 is in the standby mode and then displays the power supply status control button X on the control panel with red (S4).

The display of the power supply control button X allows the user to determine the status of the AV function section 14. Upon determining that the AV function section 14 is in the standby mode, the user uses the mouse or the like to click the power supply status control button X to recover the AV function section 14 from the standby mode. At this time, the personal computer 20 transmits a power-on command to the home server (S5).

Upon receiving this power-on command, the network processor 17 confirms that the AV function section 14 is in the standby mode, on the basis of a status signal outputted by the embedded controller 15. The network processor 17 then generates a rising edge of the up/down signal to instruct the embedded controller 15 to recover from the standby mode (S6).

Subsequently, the network processor 17 waits for the status signal output by the embedded controller 15 to indicate a normal operation mode. When the status signal indicates the normal operation mode, the network processor returns a status command to the personal computer 20, the command indicating the normal operation status (S7). Then, the personal computer 20 determines from the returned status command that the AV function section 14 is in the normal operation mode and then displays the power supply status control button X on the control panel with green (S8).

In contrast, to shift the AV function section 14 of the home server 10 to the standby mode, the user uses the mouse or the like to click the power supply status control button X. At this time, the personal computer 20 transmits a power supply standby command to the home server 20 (S9).

On the other hand, upon receiving this power supply standby command, the network processor 17 confirms that the AV function section 14 is in the normal operation mode, on the basis of a status signal outputted by the embedded controller 15. The network processor 17 then generates a rising edge of the up/down signal to instruct the embedded controller 15 to shift to the standby mode (S10).

Subsequently, the network processor 17 waits for the status signal outputted by the embedded controller 15 to indicate the standby mode. When the status signal indicates the standby mode, the network processor 17 returns a status command to the personal computer 20, the command indicating the standby status (S11). Then, the personal computer 20 determines from the returned status command that the AV function section 14 has entered the standby mode and then displays the power supply status control button X on the control panel now with red (S12).

In this manner, in this domestic network system, the network processor 17 has a mechanism that accepts a command according to the network protocol, the command causing the AV function section 14 to shift to or recover from the standby mode. The user can thus operate the AV function section 14 from the personal computer 20. The network processor 17 also has a mechanism that transmits status information indicating the status of the AV function section 14. The user can therefore use the AV function section 14 more conveniently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server apparatus comprising:
a body;
a network process unit provided in the body and configured to connect an electronic apparatus, which transmits/receives data via a first network, to a second network through the server apparatus;
an AV function unit provided in the body and configured to process video data and sound data, the AV function unit being provided with a normal operation mode and a standby mode serving to reduce power consumption;
an embedded controller configured to control a supply of power to the AV function unit and interrupt the supply of power;
a status signal line which is arranged between the network process unit and the embedded controller; and
an up/down signal line which is arranged between the network process unit and the embedded controller,
the embedded controller outputting a status signal indicating a status of the AV function unit to the status signal line, controlling the supply of power, and interrupting the supply of power based on an up/down signal on the up/down signal line,
the network process unit obtaining a current status of the AV function unit by referring the status signal output to the status signal line, returning a communication packet containing a command indicating the obtained current status of the AV function unit, when the network process unit receives, from the electronic apparatus, a communication packet containing a command to check the current status of the AV function unit, and switching an operation of the AV function unit between the normal operation mode and the standby mode by outputting the up/down signal to the up/down signal line, when the network process unit receives, from the electronic apparatus, a communication packet containing a command requesting that the operation of the AV function unit be changed.

2. The server apparatus according to claim 1, wherein, upon switching of operation of the AV function unit, the network process unit notifies the electronic apparatus that the operation of the AV function unit has been switched.

3. A server apparatus comprising:
a body;
a network process unit provided in the body and configured to connect an electronic apparatus, which transmits/receives data via a first network, to a second network through the server apparatus;
an AV function unit provided in the body and configured to process video data and sound data, the AV function unit being provided with a standby mode serving to reduce power consumption;
an embedded controller configured to control supply of power to the AV function unit and interrupt the supply of power;
a status signal line which is arranged between the network process unit and the embedded controller; and
an up/down signal line which is arranged between the network process unit and the embedded controller,
the embedded controller including:
an output unit configured to output a status signal indicating the status of the AV function unit to the status signal line; and
the network process unit including:
a detecting unit configured to detect a power supply control packet in communication packets sent from the electronic apparatus, the power supply control packet containing one of a status check command to check the current status of the AV function unit, a power-on command for causing the AV function unit to recover from the standby mode, and a power supply standby command for causing the AV function unit to shift to the standby mode; and a controlling unit configured to: obtain a current status of the AV function unit by referring the status signal on the status signal line, return a communication packet containing a command indicating the current status of the AV function unit, when the detecting unit detects the power supply control packet containing the status check command, and cause the AV function unit to recover from or shift to the standby mode by outputting the up/down signal to the up/down signal line, when the detecting unit detects the power supply control packet containing the power-on command or the power supply standby command.

* * * * *